(12) United States Patent
Das et al.

(10) Patent No.: US 11,234,038 B2
(45) Date of Patent: *Jan. 25, 2022

(54) METHOD AND APPARATUS FOR LOCATION BASED BROADCAST CHANNEL SELECTION AND UPDATE FOR MOBILE DEVICES

(71) Applicant: Charter Communications Operating, LLC, St. Louis, MO (US)

(72) Inventors: Manoj Kumar Das, Frisco, TX (US); Perwaiz Akhtar, Aurora, CO (US); MohammedYusuf M. Shaikh, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,859

(22) Filed: Sep. 29, 2020

(65) Prior Publication Data

US 2021/0029402 A1 Jan. 28, 2021

Related U.S. Application Data

(63) Continuation of application No. 16/404,094, filed on May 6, 2019, now Pat. No. 10,812,852.

(51) Int. Cl.
*H04N 7/173* (2011.01)
*H04N 21/414* (2011.01)
*H04N 21/643* (2011.01)
*H04N 21/433* (2011.01)

(52) U.S. Cl.
CPC ... *H04N 21/41407* (2013.01); *H04N 21/4333* (2013.01); *H04N 21/64322* (2013.01)

(58) Field of Classification Search
CPC ....... H04N 21/41407; H04N 21/64322; H04N 21/4333; H04N 21/4826; H04N 21/266; H04N 21/4524
USPC ......................................................... 725/132
See application file for complete search history.

(56) References Cited

U.S. PATENT DOCUMENTS

| | | | |
|---|---|---|---|
| 7,676,219 B2* | 3/2010 | Williams | H04L 63/10 455/411 |
| 8,255,378 B2* | 8/2012 | Ji | H04N 21/4383 707/706 |
| 8,370,872 B1* | 2/2013 | Sun | H04N 21/4826 725/39 |
| 8,737,990 B2* | 5/2014 | Moreillon | H04L 63/10 455/434 |

(Continued)

*Primary Examiner* — Michael B. Pierorazio
(74) *Attorney, Agent, or Firm* — Young Basile Hanlon & MacFarlane, P.C.

(57) ABSTRACT

Disclosed herein are methods and apparatus for location based broadcast channel selection and update for mobile devices. The location based broadcast channel selection and update method includes determining a location of a mobile device. The location is checked against a current location area. A query is sent to a license server with the location if the location is beyond the current location area. A list of television broadcast channels associated with the location is sent by the license server and the received list of television broadcast channels are mapped against the current list of television broadcast channels. The mobile device is reconfigured with the mapped list of television broadcast channels.

20 Claims, 6 Drawing Sheets

(56) References Cited

U.S. PATENT DOCUMENTS

| | | | |
|---|---|---|---|
| 9,532,090 B2 | 12/2016 | Babaei | |
| 10,111,136 B2 | 10/2018 | Babaei | |
| 2003/0097408 A1* | 5/2003 | Kageyama | H04L 12/1818 709/205 |
| 2003/0192054 A1* | 10/2003 | Birks | H04N 21/234381 725/100 |
| 2003/0233580 A1* | 12/2003 | Keeler | H04L 12/2898 726/7 |
| 2005/0097593 A1* | 5/2005 | Raley | H04N 21/2543 725/14 |
| 2006/0064734 A1* | 3/2006 | Ma | H04N 21/44008 725/136 |
| 2006/0253560 A1* | 11/2006 | Aaltonen | H04H 60/31 709/223 |
| 2007/0067807 A1* | 3/2007 | O'Neil | H04N 21/42684 725/62 |
| 2007/0067817 A1* | 3/2007 | Hamilton | H04N 21/4788 725/100 |
| 2007/0107022 A1* | 5/2007 | Lawrence, III | H04N 21/8352 725/92 |
| 2007/0157234 A1* | 7/2007 | Walker | H04N 7/163 725/38 |
| 2007/0237330 A1* | 10/2007 | Srivastava | H04N 21/6408 380/212 |
| 2007/0240192 A1* | 10/2007 | Acharya | H04N 21/4383 725/87 |
| 2008/0005770 A1* | 1/2008 | Acharya | H04N 7/17336 725/101 |
| 2008/0060035 A1* | 3/2008 | Tsang | H04N 21/632 725/109 |
| 2008/0184326 A1* | 7/2008 | Nakajima | H04N 21/252 725/133 |
| 2008/0201225 A1* | 8/2008 | Maharajh | H04M 15/41 705/14.43 |
| 2008/0216107 A1* | 9/2008 | Downey | H04N 21/812 725/22 |
| 2008/0235733 A1* | 9/2008 | Heie | H04N 7/17318 725/46 |
| 2008/0270725 A1* | 10/2008 | Roden | H04N 21/4334 711/165 |
| 2008/0301737 A1 | 12/2008 | Hjelmeland Almas et al. | |
| 2008/0307478 A1* | 12/2008 | Kim | H04L 65/4076 725/114 |
| 2008/0311952 A1 | 12/2008 | Sugiyama | |
| 2010/0180305 A1* | 7/2010 | Migos | H04N 21/26283 725/45 |
| 2010/0199316 A1* | 8/2010 | Clarniello | H04H 60/91 725/62 |
| 2010/0296487 A1* | 11/2010 | Karaoguz | H04W 84/045 370/332 |
| 2011/0086619 A1* | 4/2011 | George | H04M 1/72415 455/414.1 |
| 2011/0119595 A1* | 5/2011 | Bydeley | H04N 21/4782 715/738 |
| 2011/0137592 A1* | 6/2011 | Kim | G01R 21/00 702/62 |
| 2011/0196983 A1* | 8/2011 | Goodmon | G06F 21/10 709/231 |
| 2011/0279311 A1* | 11/2011 | Hamano | G06F 16/29 342/357.25 |
| 2011/0298596 A1* | 12/2011 | Warrick | H04L 12/282 340/12.53 |
| 2011/0302607 A1* | 12/2011 | Warrick | H04N 21/4126 725/39 |
| 2012/0127374 A1* | 5/2012 | Kanojia | H04N 21/2393 348/731 |
| 2012/0266201 A1* | 10/2012 | Kanojia | H04N 21/2187 725/109 |
| 2013/0097315 A1 | 4/2013 | Hao et al. | |
| 2013/0127665 A1* | 5/2013 | Miller | H01Q 1/42 342/359 |
| 2013/0198787 A1* | 8/2013 | Perry, II | H04N 21/4524 725/86 |
| 2013/0276017 A1* | 10/2013 | Walker | H04N 21/2407 725/25 |
| 2014/0096163 A1* | 4/2014 | Perry, II | H04N 7/106 725/74 |
| 2015/0230004 A1* | 8/2015 | VanDuyn | H04N 21/42204 725/27 |
| 2018/0035146 A1* | 2/2018 | Goetz | H04N 21/4524 |

\* cited by examiner

METHOD AND APPARATUS FOR LOCATION BASED BROADCAST CHANNEL SELECTION AND UPDATE FOR MOBILE DEVICES

CROSS REFERENCE TO RELATED APPLICATIONS

This application is a continuation of U.S. patent application Ser. No. 16/404,094, filed on May 6, 2019, the entire content of which is incorporated by reference.

TECHNICAL FIELD

This disclosure relates to streaming television on mobile devices. More specifically, this disclosure relates to selecting and updating a broadcast channel list based on a location of the mobile device.

BACKGROUND

Mobile devices use Internet Protocol (IP) based applications (IP video application) to stream television content, video, media and other like content from service providers. The service providers offer a variety of content sources including, but not limited to, television broadcast channels. The rights to broadcast on a television broadcast channel is typically tied to a geographic location. Consequently, a service provider's IP video application on the mobile device may list and use the television broadcast channels which are offered at a home location of the mobile device. Once the mobile device leaves the home location, the IP video application will not be able to stream content from the listed television broadcast channels since there are no broadcasting rights or license outside of the home location.

SUMMARY

Disclosed herein are methods and apparatus for location based broadcast channel selection and update for mobile devices. The location based broadcast channel selection and update method includes determining a location of a mobile device. The location is checked against a current location area. A query is sent to a license server with the location if the location is beyond the current location area. A list of television broadcast channels associated with the location is sent by the license server and the received list of television broadcast channels are mapped against the current list of television broadcast channels. The mobile device is reconfigured with the mapped list of television broadcast channels. The channel listing on the mobile device is updated with the local broadcast channels for the location.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1:
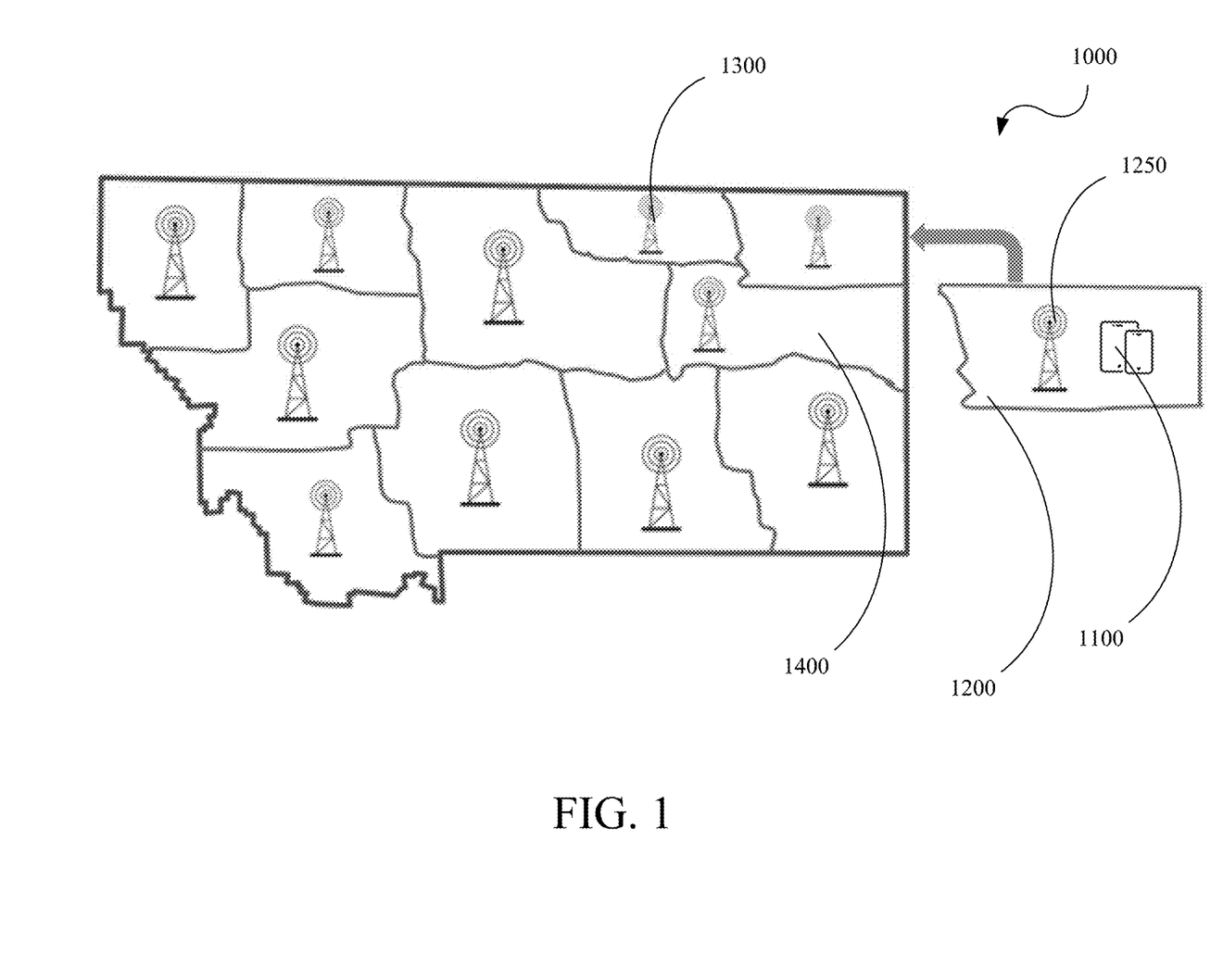
FIG. 1 is a diagram of an example scenario in accordance with embodiments of this disclosure.

FIG. 1 is a diagram of an example scenario 1000 in accordance with embodiments of this disclosure. In scenario 1000, a mobile device 1100 may be in a home location 1200. The mobile device 1100 may use Internet Protocol (IP) based applications (IP video application) to stream content from a television broadcast channel 1250 that is operational in the home location 1200. That is, the rights to broadcast on the television broadcast channel are tied to the home location 1200. In particular, a service provider associated with the mobile device 1100 may provide a list of television broadcast channels that are licensed for broadcast in the home location 1200. As the mobile device 1100 leaves the home location 1200 to other geographic locations such geographic locations 1300 or 1400, the IP video application will stop streaming content from the listed television broadcast channels since there are no broadcasting rights or license outside of the home location 1200. However, the mobile device 1100 will continue to list the same television broadcast channels as the list is a static list of same television broadcast channels which are tied to the home location 1200.

Described herein are methods and apparatus for location based broadcast channel selection and update for mobile devices. Mobile devices and the IP video applications are provided a mechanism for updating the list of television broadcast channels when the mobile device has moved locations. A static and non-operational list of television broadcast channels may be replaced with a list a of television broadcast channels which are operational in the new location. The mechanism may improve user experience when using the IP video application during travel. For example, this may prevent a user from being disconnected when viewing a show.

In an implementation, a service provider may track a location of the mobile device. If the service provider determines that the mobile device has left a home location, the service provider may then determine from a licensing server, such as the Federal Communications Commission server, a list of television broadcast channels which are operable at a determined location of the mobile device. The service provider maps the new list of television broadcast channels with the current set of television broadcast channels and provides an updated list of television broadcast channels to the IP video application.

In an implementation, the IP video application may send a notification that there is going to be an update to the list of television broadcast channels. In the event the IP video application is open and a show is being viewed, the IP video application may transition from a current television broadcast channel to an updated television broadcast channel. The user may therefore enjoy the show in a near uninterrupted fashion.

In an implementation, a user of the mobile device may be alerted that the IP video application is going to be reconfigured with a new set of television broadcast channels. This may prevent the user from initiating the IP video application until completion of the reconfiguration. In an implementation, this may allow the user to pause a current show until completion of the reconfiguration.

In an implementation, the service provider may track the location of the mobile device on a defined interval or on a periodic basis. This maintains the list of television broadcast channels current without a measurable increase in network traffic.

Figure 2:
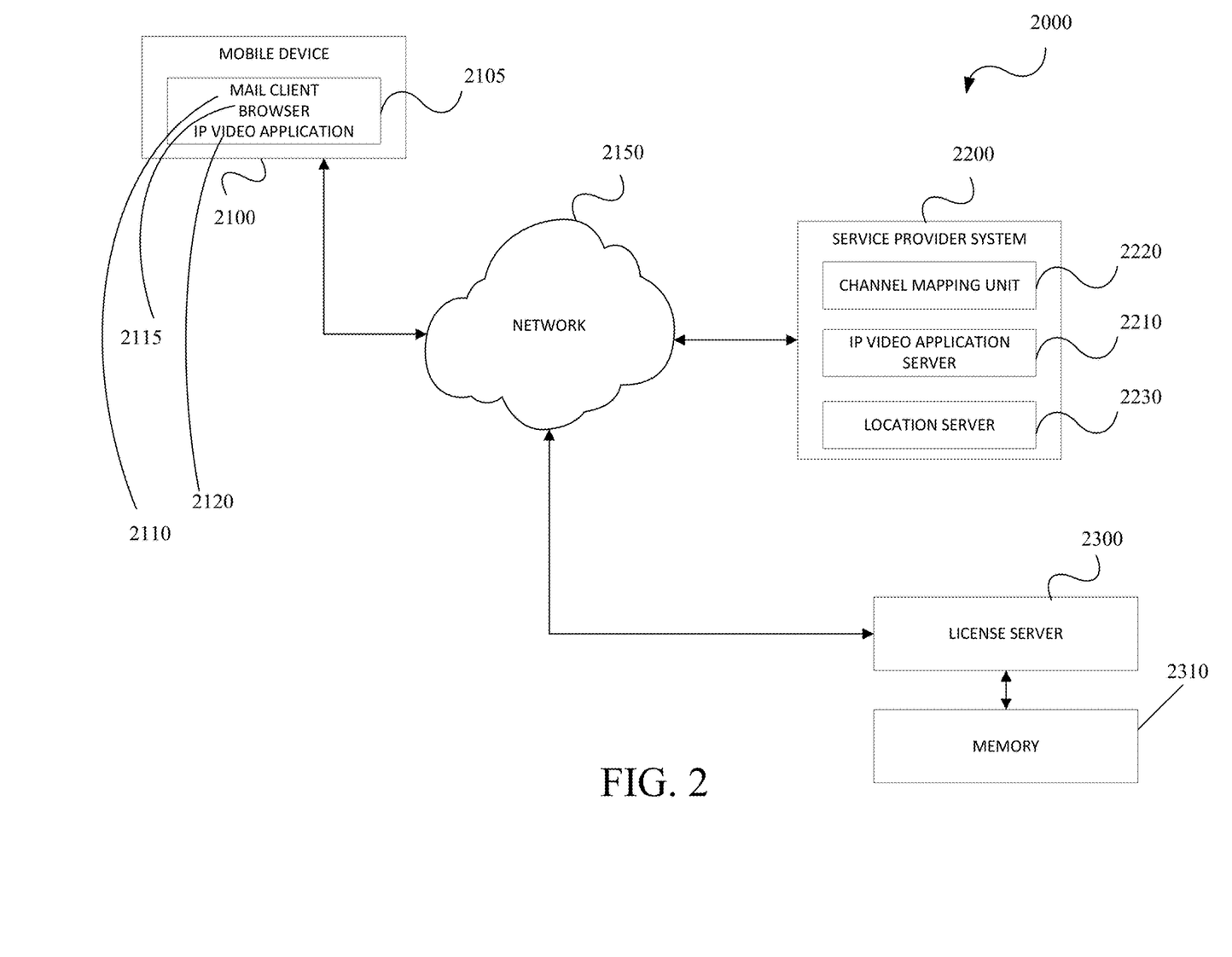
FIG. 2 is a diagram of an example architecture of a network in accordance with embodiments of this disclosure.

FIG. 2 is a diagram of an example architecture 2000 for updating television broadcast channels in accordance with embodiments of this disclosure. In an implementation, the architecture 2000 may include a mobile device 2100 connected to or in communication with (collectively "connected to") a service provider system 2200 via a network 2150. The service provider system 2200 may also be connected to a license server 2300, such as, but not limited to, a Federal Communications Commission ("FCC") server, via the network 2150. The connections between the mobile device 2100, the service provider system 2200, the network 2150 and the license server 2300 may be wired, wireless or a combination thereof. In an implementation, the architecture 2000 may execute the techniques described in FIGS. 4-6. The architecture 2000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The mobile device 2100 may be, but is not limited to, end user devices, cellular telephones, Internet Protocol (IP) devices, mobile computers, laptops, handheld computers, PDAs, personal media devices, smartphones, notebooks, notepads, phablets and the like. For example, in an implementation, the mobile device 2100 may include applications such as, but not limited to, a mail application 2110, a web browser application 2115, an IP video application 2120 and the like.

The service provider system 2200 may provide connectivity and content to the mobile device 2100. The service provider system 2200 may include, but is not limited to, an IP video application server 2210, a channel mapping unit 2220, and a location server 2230. In an implementation, the IP video application server 2210 and the channel mapping unit 2220 may be an integrated server or element. The service provider system 2200 may maintain a home area, a current location area, a current location, and/or combinations thereof for the mobile device 2100. In an implementation, the home area, the current location area, and the current location may be defined using known and future techniques for defining geographical areas and locations. In an implementation, the home area, the current location area, and the current location may be maintained by the IP video application server 2210. In an implementation, the home area, the current location area, and the current location may be maintained by the location server 2230. The service provider system 2200 is illustrative and may include additional, fewer or different devices, entities and the like which may be similarly or differently architected without departing from the scope of the specification and claims herein.

The IP video application server 2210 may communicate with the IP video application 2105 on the mobile device 2100. In an implementation, the communication may be via an IP network in the network 2150. The communication may include content and control data. In an implementation, the control data may include, but is not limited to, television broadcast channel lists, a reconfiguration command, and alert notifications.

The location server 2230 may use multiple location determination techniques to determine the location of the mobile device 2100. The location determination techniques may include, but are not limited to, global positioning system (GPS) data sent by the mobile device 2100, triangulation (using for example base stations), WiFi service set identifier (SSID), IP address, and/or combinations thereof. In an implementation, the location determination techniques may have a defined prioritization. For example, a priority order may be GPS, triangulation, WiFi SSID, and IP address. In an implementation, an accuracy or error threshold may be used to determine which location determination technique to use. For example, two location determination techniques may each provide a location, but one has a larger margin of error. In this case, the more accurate location determination technique may be used. In an implementation, the location server 2230 may compare and combine locations from different location determination techniques to determine the location of the mobile device 2100.

The channel mapping unit 2220 may use the television broadcast channel information from the license server 2300 to map and determine how to update a current television broadcast channel list on the mobile device 2100. In an implementation, if a mapping for a current television broadcast channel is not available, an alert or notification may be provided. In an implementation, if a new television broadcast channel is available, an alert or notification may be provided. In an implementation, the channel mapping unit 2220 may determine the name and status of a content being streamed so that upon reconfiguration the content may be resumed appropriately.

The license server 2300 may maintain a list of television broadcast channels which may be indexed by a geographic area and/or region. For example, the geographic area may be a county, a group of counties, or other like geographic delineation. In an implementation, the license server 2300 may access a memory 2310 which may contain the list of television broadcast channels. In an implementation, information from the license server 2300 may be accessed by sending a query or other like message. The message, for example, may include the mobile device location in question.

The network 2150 may be and may include, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, an IP network, and like including any combinations thereof. In an implementation, the network 2150 may contain one or more servers, network elements or devices, and the like.

Operationally, the service provider system 2200 may track or monitor a location of the mobile device 2100 using the location server 2230. In an implementation, the IP video application server 2210 may receive the location data from the location server 2230 and compare the new location against the home area and/or the current area. If the new location is determined to be within the home area and/or the current area, then no updates are made to the IP video application 2120 on the mobile device 2100. If the new location is determined to be beyond the home area and/or the current area, then the service provider system 2200 may send a real-time query to the license server 2300 to determine the list of the television broadcast channels for the new location and the geographic area associated with the new location. In addition, the IP video application server 2210 may send an alert to the IP video application 2120 on the mobile device 2100 of a television broadcast channel reconfiguration. The channel mapping unit 2220 may map the new television broadcast channels with the current television broadcast channels and if appropriate, may determine a name and status of content being viewed. The IP video application server 2210 may then send to the IP video application 2120 a reconfiguration command with the mapped television broadcast channels and if appropriate, the name and status of the content so that the IP video application 2120 may resume streaming of the content at the right place. The new location and the geographic area associated with the new location may be saved as the current location and the current area, respectively.

Figure 3:
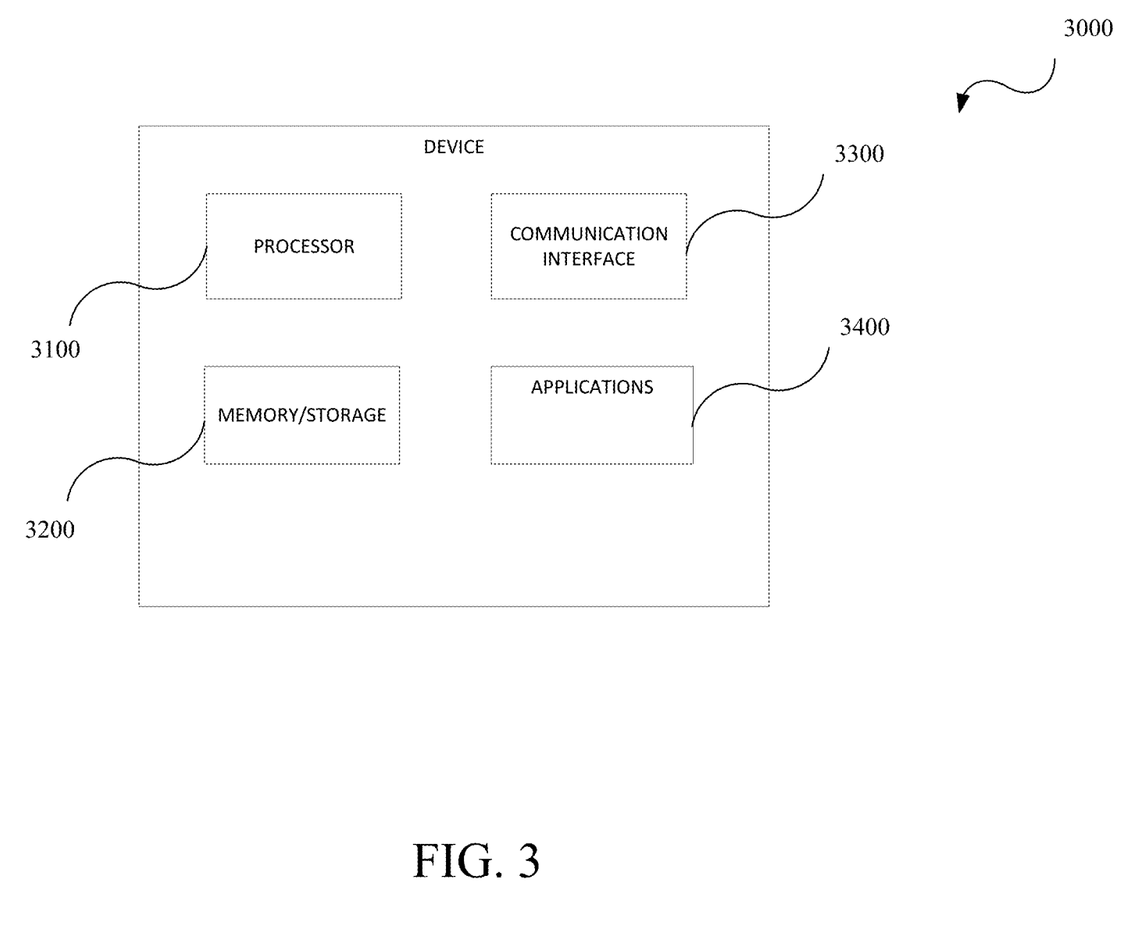
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the mobile device 2100, elements of the service provider system 2200, the IP video application server 2210, the location server 2230, the channel mapping unit 2220, and the license server 2300. In an implementation, the memory/storage 3200 may store the home area, current location area, current location, current television broadcast channels, name of content and status of content. The location based broadcast channel selection and update techniques or methods described herein may be stored in the memory/storage 3200 and executed by the processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
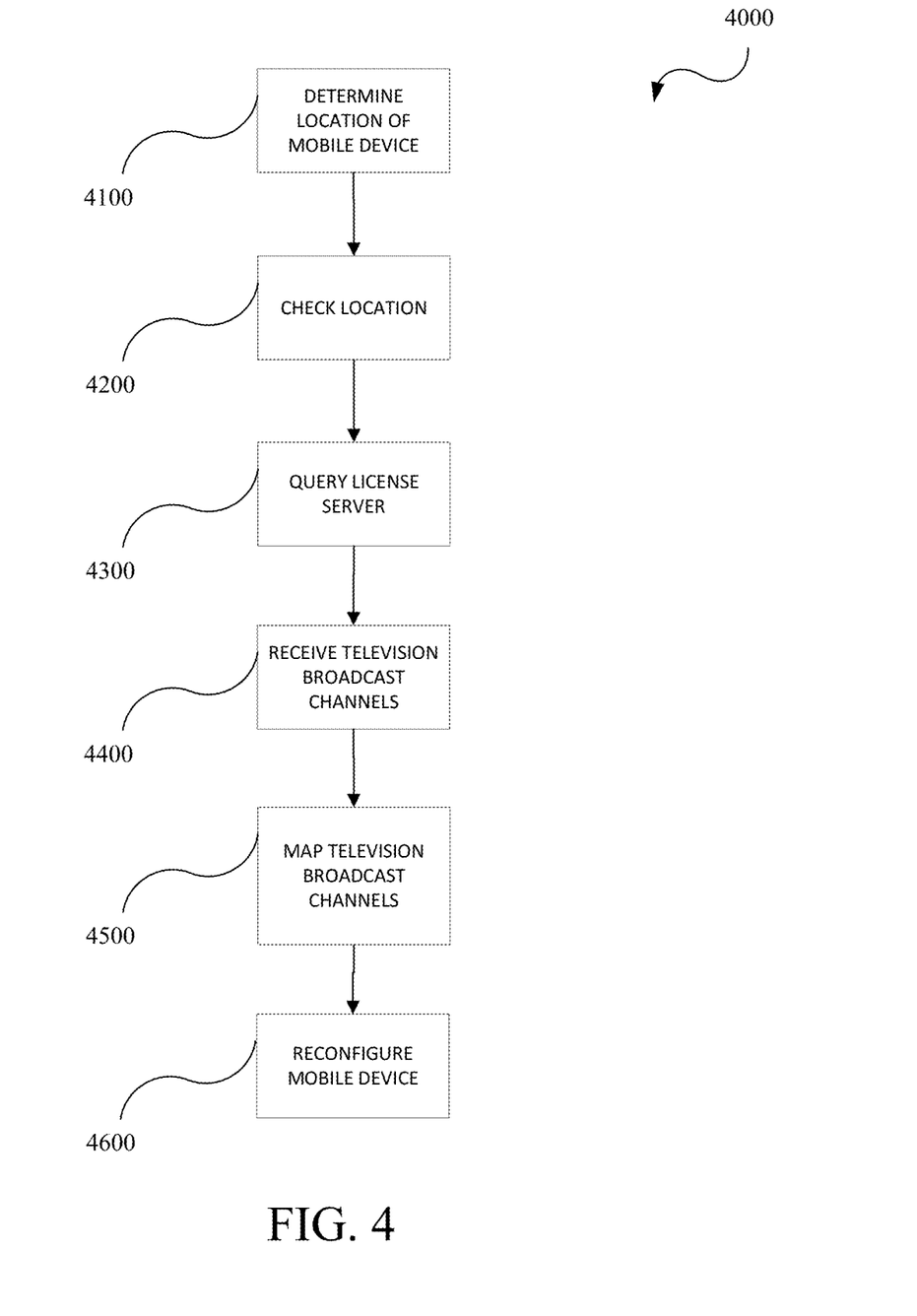
FIG. 4 is a flowchart of an example method for enhanced DNS response caching in accordance with embodiments of this disclosure.

FIG. 4 is a flowchart of an example method 4000 location based broadcast channel selection and update in accordance with embodiments of this disclosure. The method 4000 includes: determining 4100 a location of a mobile device; checking 4200 whether the location is within a home area; querying 4300 a license server with the location if the location is beyond the home area; receiving 4400 a list of television broadcast channels associated with the location; mapping 4500 the received list of television broadcast channels with a current list of television broadcast channels; and reconfiguring 4600 the mobile device with the mapped list of television broadcast channels. For example, the technique 4000 may be implemented, as applicable and appropriate, by the mobile device 2100 of FIG. 2, the IP video application 2120 of FIG. 2, the service provider system 2200 of FIG. 2, the IP video application server 2210 of FIG. 2, the channel mapping unit 2220 of FIG. 2, the location server 2230 of FIG. 2, and the license server 2300 of FIG. 2.

The method 4000 includes determining 4100 a location of a mobile device. In an implementation, the location may be determined from GPS data sent by the mobile device. In an implementation, the location may be determined by triangulation using, for example, base stations and the like. In an implementation, the location may be based on a WiFi SSID. In an implementation, the location may be based on an IP address. In an implementation, the location may be determined from a combination of location determination techniques including, but not limited to, GPS, triangulation, WiFi service set identifier (SSID), IP address, and the like. In an implementation, the location determination techniques may have a defined prioritization. In an implementation, an accuracy or error threshold may be used to determine which location determination technique to use. In an implementation, a location server may compare and combine locations from different location determination techniques to determine the location of the mobile device. In an implementation, the determining 4100 includes periodically determining a location of the mobile device. In an implementation, the determining 4100 includes determining a location when the mobile device is turned on. In an implementation, the determining 4100 includes determining a location when the IP video application is initiated. In an implementation, the determining 4100 includes determining a location at defined intervals when the mobile device is streaming content.

The method 4000 includes checking 4200 whether the location is within a home area. In an implementation, the home area may be defined using known and future techniques for defining geographical areas and locations. In an implementation, the home area may be a county. In an implementation, the home area may be associated with or defined in accordance with the geographic area(s) used by a license server.

The method 4000 includes querying 4300 a license server with the location if the location is beyond the home area. In an implementation, the license server may have a database of television broadcast channels indexed by geographic areas. That is, the database includes the list of television broadcast channels that are licensed for broadcasting in a geographic area or a set of geographic areas. In an implementation, the license server determines which geographic area includes the location sent in the query. In an implementation, the querying 4300 includes sending a notification to the mobile device or IP video application of an upcoming reconfiguration. In an implementation, the notification may be a visual or audible notification. In an implementation, the notification may pause active streaming of content to permit reconfiguration.

The method 4000 includes receiving 4400 a list of television broadcast channels associated with the location. In an implementation, the license server may access the database using the geographic area which includes the location sent in the query. The license server may send the list of television broadcast channels to, for example, a channel mapping unit or the IP video application server.

The method 4000 includes mapping 4500 the received list of television broadcast channels with a current list of television broadcast channels. In an implementation, a notification(s) may be made for missing television broadcast channels and new television broadcast channels. The mapping 4500 may include determining content data that may be active, paused, or saved on the mobile device. As appropriate, the content data may include the name of the content, a television broadcast channel for the content, a time stamp associated with the content, content status, active streaming, paused streaming, saved streaming, and the like. In an implementation, the mapping 4500 may include sending a notification which may pause active streaming of the content to permit reconfiguration.

The method 4000 includes reconfiguring 4700 the mobile device with the mapped list of television broadcast channels. In an implementation, a reconfiguration command may be sent to the IP video application. The reconfiguration command may include the mapped list of television broadcast channels and if appropriate, the content data. The content data may be used by the IP video application to resume streaming of the content. For example, if the streaming is paused or saved, then the IP video application may resume streaming the content at the right time on the appropriate mapped television broadcast channel. The channel listing on the mobile device is updated with the local broadcast channels for the location.

Figure 5:
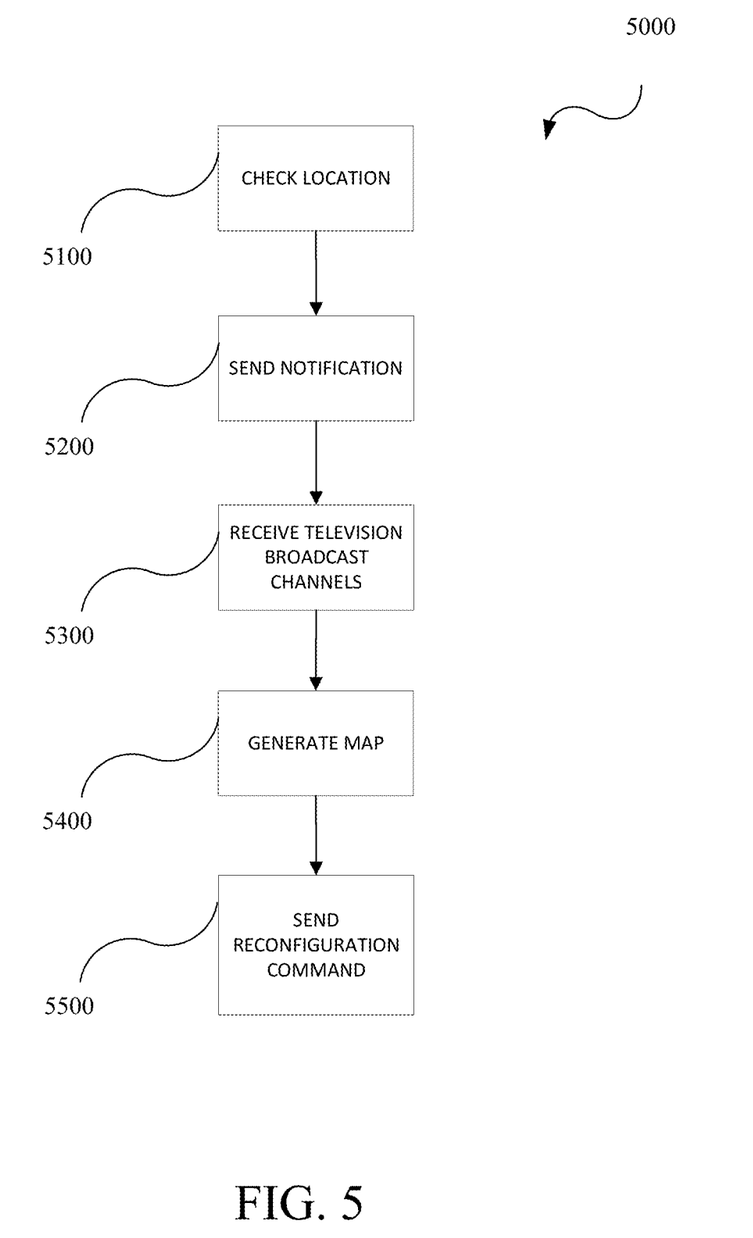
FIG. 5 is a flowchart of another example method for enhanced DNS response caching in accordance with embodiments of this disclosure.

FIG. 5 is a flowchart of an example method 5000 location based broadcast channel selection and update in accordance with embodiments of this disclosure. The method 5000 includes: checking 5100 whether a location of a mobile device is within a current location area; sending 5200 a notification to the mobile device when the location is outside the current location area; receiving 5300 a list of television broadcast channels associated with the location when the location is outside the current location area; generating 5400 a map based on the received list of television broadcast channels and a current list of television broadcast channels; and sending 5500 a reconfiguration command to the mobile device, the reconfiguration command including at least the mapped list of television broadcast channels. For example, the technique 5000 may be implemented, as applicable and appropriate, by the mobile device 2100 of FIG. 2, the IP video application 2120 of FIG. 2, the service provider system 2200 of FIG. 2, the IP video application server 2210 of FIG. 2, the channel mapping unit 2220 of FIG. 2, the location server 2230 of FIG. 2, and the license server 2300 of FIG. 2.

The method 5000 includes checking 5100 whether a location of a mobile device is within a current location area. In an implementation, the current location area may be defined using known and future techniques for defining geographical areas and locations. In an implementation, the current location area may be a county. In an implementation, the current location area may be associated with or defined in accordance with the geographic area(s) used by a license server. In an implementation, the checking 5100 includes obtaining a location of a mobile device. In an implementation, the location may be determined from GPS data sent by the mobile device. In an implementation, the location may be determined by triangulation using, for example, base stations and the like. In an implementation, the location may be based on a WiFi SSID. In an implementation, the location may be based on an IP address. In an implementation, the location may be determined from a combination of location determination techniques including, but not limited to, GPS, triangulation, WiFi service set identifier (SSID), IP address, and the like. In an implementation, the location determination techniques may have a defined prioritization. In an implementation, an accuracy or error threshold may be used to determine which location determination technique to use. In an implementation, a location server may compare and combine locations from different location determination techniques to determine the location of the mobile device. In an implementation, the checking 5100 includes periodically determining a location of the mobile device. In an implementation, the checking 5100 includes determining a location when the mobile device is turned on. In an implementation, the checking 5100 includes determining a location when the IP video application is initiated. In an implementation, the checking 5100 includes determining a location at defined intervals when the mobile device is streaming content.

The method 5000 includes sending 5200 a notification to the mobile device when the location is outside the current location area. The notification may indicate an upcoming reconfiguration. In an implementation, the notification may be a visual or audible notification. In an implementation, the notification may pause active streaming of content to permit reconfiguration.

The method 5000 includes receiving 5300 a list of television broadcast channels associated with the location when the location is outside the current location area. The receiving 5300 includes querying a license server with the location when the location is outside the current location area. In an implementation, the license server may have a database of television broadcast channels indexed by geographic areas. That is, the database includes the list of television broadcast channels that are licensed for broadcasting in a geographic area or a set of geographic areas. In an implementation, the license server determines which geographic area includes the location sent in the query. In an implementation, the license server may access the database using the determined geographic area. The license server may send the list of television broadcast channels to, for example, a channel mapping unit or the IP video application server.

The method 5000 includes generating 5400 a map based on the received list of television broadcast channels and a current list of television broadcast channels. In an implementation, the map may include notification(s) for missing television broadcast channels and new television broadcast channels. The generating 5400 may include determining content data that may be active, paused, or saved on the mobile device. As appropriate, the content data may include the name of the content, a television broadcast channel for the content, a time stamp associated with the content, content status, active streaming, paused streaming, saved streaming, and the like. In an implementation, the generating 5400 may include sending a notification which may pause active streaming of the content to permit reconfiguration.

The method 5000 includes sending 5500 a reconfiguration command to the mobile device, the reconfiguration command including at least the mapped list of television broadcast channels. The reconfiguration command may also include, as appropriate, the content data. The content data may be used by the IP video application to resume streaming of the content. For example, if the streaming is paused or saved, then the IP video application may resume streaming the content at the right time on the appropriate mapped television broadcast channel. The channel listing on the mobile device is updated with the local broadcast channels for the location.

Figure 6:
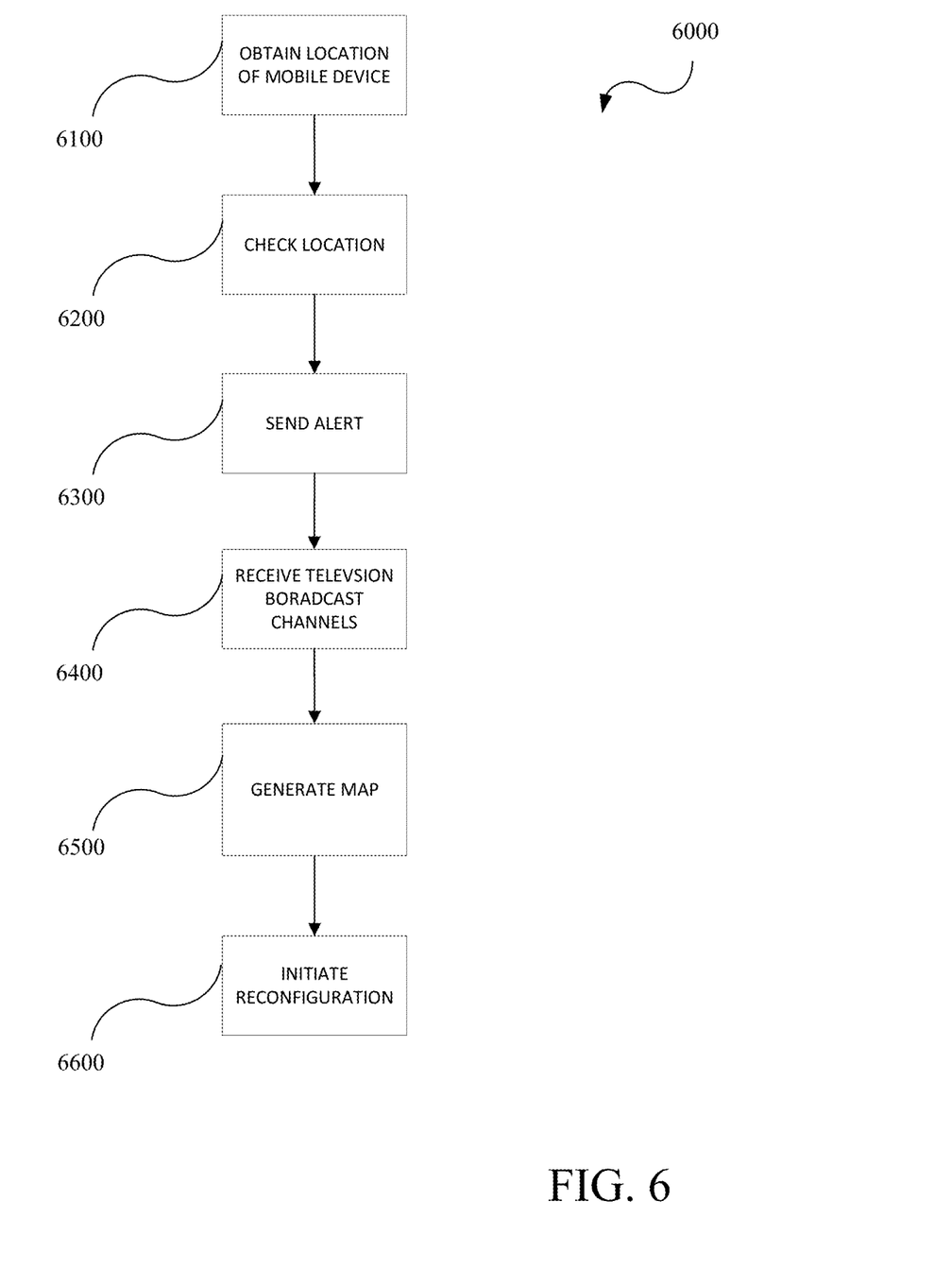
FIG. 6 is a flowchart of another example method for enhanced DNS response caching in accordance with embodiments of this disclosure.

FIG. 6 is a flowchart of an example method 6000 location based broadcast channel selection and update in accordance with embodiments of this disclosure. The method 6000 includes: obtaining 6100 a location of a mobile device; checking 6200 whether a location of a mobile device is inside a licensed area; sending 6300 an alert when leaving the licensed area; receiving 6400 a list of television broadcast channels for a new licensed area based on the location; generating 6500 a map based on the received list of television broadcast channels, a current list of television broadcast channels, and content data; and initiating 6600 a reconfiguration at the mobile device with at least the mapped list of television broadcast channels. For example, the technique 6000 may be implemented, as applicable and appropriate, by the mobile device 2100 of FIG. 2, the IP video application 2120 of FIG. 2, the service provider system 2200 of FIG. 2, the IP video application server 2210 of FIG. 2, the channel mapping unit 2220 of FIG. 2, the location server 2230 of FIG. 2, and the license server 2300 of FIG. 2.

The method 6000 includes obtaining 6100 a location of a mobile device. In an implementation, the location may be determined from GPS data sent by the mobile device. In an implementation, the location may be determined by triangulation using, for example, base stations and the like. In an implementation, the location may be based on a WiFi SSID. In an implementation, the location may be based on an IP address. In an implementation, the location may be determined from a combination of location determination techniques including, but not limited to, GPS, triangulation, WiFi service set identifier (SSID), IP address, and the like. In an implementation, the location determination techniques may have a defined prioritization. In an implementation, an accuracy or error threshold may be used to determine which location determination technique to use. In an implementation, a location server may compare and combine locations from different location determination techniques to determine the location of the mobile device. In an implementation, the determining 6100 includes periodically determining a location of the mobile device. In an implementation, the determining 6100 includes determining a location when the mobile device is turned on. In an implementation, the determining 6100 includes determining a location when the IP video application is initiated. In an implementation, the determining 6100 includes determining a location at defined intervals when the mobile device is streaming content.

The method 6000 includes checking 6200 whether a location of a mobile device is inside a licensed area. In an implementation, the licensed area may be defined using known and future techniques for defining geographical areas and locations. In an implementation, the licensed area may be associated with or defined in accordance with the geographic area(s) used by a license server. In an implementation, the licensed area may be a county.

The method 6000 includes sending 6300 an alert when leaving the licensed area. The alert may indicate an upcoming reconfiguration. In an implementation, the alert may be a visual or audible alert. In an implementation, the alert may pause active streaming of content to permit reconfiguration.

The method 6000 includes receiving 6400 a list of television broadcast channels for a new licensed area based on the location. The includes querying a license server with the location when the mobile device is leaving or has left the licensed area. In an implementation, the license server may have a database of television broadcast channels indexed by geographic areas. That is, the database includes the list of television broadcast channels that are licensed for broadcasting in a geographic area or a set of geographic areas. In an implementation, the license server determines which geographic area includes the location sent in the query. In an implementation, the license server may access the database using the determined geographic area. The license server may send the list of television broadcast channels to, for example, a channel mapping unit or the IP video application server. In an implementation, a notification may be sent to the mobile device or IP video application of an upcoming reconfiguration. In an implementation, the notification may be a visual or audible notification. In an implementation, the notification may pause active streaming of content to permit reconfiguration.

The method 6000 includes generating 6500 a map based on the received list of television broadcast channels, a current list of television broadcast channels, and content data. In an implementation, the map may include notification(s) for missing television broadcast channels and new television broadcast channels. The map may include content data on the mobile device that may be active, paused, or saved. As appropriate, the content data may include the name of the content, a television broadcast channel for the content, a time stamp associated with the content, content status, active streaming, paused streaming, saved streaming, and the like. In an implementation, the generating 6500 may include sending a notification which may pause active streaming of the content to permit reconfiguration.

The method 6000 includes initiating 6600 a reconfiguration at the mobile device with at least the mapped list of television broadcast channels. The initiating 6600 may include sending a reconfiguration message to the IP video application. The reconfiguration message may include the mapped list of television broadcast channels and if appropriate, the content data. The content data may be used by the IP video application to resume streaming of the content. For example, if the streaming is paused or saved, then the IP video application may resume streaming the content at the right time on the appropriate mapped television broadcast channel. The channel listing on the mobile device is updated with the local broadcast channels for the location.

In general, a method for location based broadcast channel selection and update includes determining a location of a mobile device and checking whether the location is within a current location area. A license server is queried with the location if the location is beyond the current location area. A list of television broadcast channels associated with the location is received from the license server. The received list of television broadcast channels is mapped with a current list of television broadcast channels. The mobile device is reconfigured with the mapped list of television broadcast channels. In an implementation, the location may be determined using at least one of global positioning system (GPS), triangulation, WiFi service set identifier (SSID), and Internet Protocol (IP) address. In an implementation, the location is associated with a geographic area and the received list of television broadcast channels is associated with the geographic area. In an implementation, a notification is sent to the mobile device. In an implementation, the notification pauses active streaming on the mobile device. In an implementation, the content data for at least one of active streaming content, paused streaming content, or saved streaming content is determined on the mobile device. In an implementation, the content data includes at least one of a name of active content, a name of paused content, a name of saved content, television broadcast channel for the active content, television broadcast channel for the paused content, television broadcast channel for the saved content, time data associated with the active content, time data associated with the paused content, time data associated with the saved content, content status, active streaming data, paused streaming data, and saved streaming data. In an implementation, the reconfiguring causes active streaming to pause and resume on a reconfigured television broadcast channel using the content data.

In general, a method for location based broadcast channel reconfiguration includes checking whether a location is inside a licensed area. A real-time query is sent to a license server when the mobile device is leaving or has left the licensed area, where the real-time query includes the location. A list of television broadcast channels associated with a new licensed area associated with the location is received from the license server. A map is generated from the received list of television broadcast channels and a current list of television broadcast channel. A reconfiguration command is sent to the mobile device with the map. In an implementation, the location may be determined using a prioritized list of global positioning system (GPS), triangulation, WiFi service set identifier (SSID), and Internet Protocol (IP) address. In an implementation, the location is associated with a geographic area and the received list of television broadcast channels is associated with the geographic area, and wherein the licensed area and the new licensed area are geographic areas. In an implementation, the method includes sending a reconfiguration alert to the mobile device when the mobile device is leaving or has left the licensed area. In an implementation, the reconfiguration alert pauses active streaming on the mobile device. In an implementation, content data for at least one of active streaming content, paused streaming content, or saved streaming content on the mobile device is determined. In an implementation, the content data includes at least one of a name of active content, a name of paused content, a name of saved content, television broadcast channel for the active content, television broadcast channel for the paused content, television broadcast channel for the saved content, time data associated with the active content, time data associated with the paused content, time data associated with the saved content, content status, active streaming data, paused streaming data, and saved streaming data. In an implementation, the reconfiguration command causes active streaming to pause and resume on a mapped television broadcast channel using the content data.

In general, an apparatus includes a location server and an Internet Protocol (IP) video application server. The IP video application server configured to obtain a location of a mobile device from the location server, send a query to a license server when the location is outside a current location area, receive a list of television broadcast channels associated with a geographic area which includes the location, generate map and content data from the received list of television broadcast channels, a current list of television broadcast channels, and content data for at least one of active streaming content, paused streaming content, or saved streaming content on the mobile device, and send a message to the mobile device with the map and the content data to reconfigure the mobile device. In an implementation, the location server is configured to determine the location using at least one of global positioning system (GPS), triangulation, WiFi service set identifier (SSID), and Internet Protocol (IP) address based on accuracy of location data. In an implementation, the IP video application server is further configured to send a pause command to permit reconfiguration of the mobile device. In an implementation, the message causes the mobile device to resume streaming on a mapped television broadcast channel using the content data.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for location based broadcast channel selection and update, the method comprising:
   determining whether a location of a tracked mobile device is within a current location area;
   generating a list of licensed broadcast channels associated with the location when the location is beyond the current location area;
   mapping a comparison between the generated list of licensed broadcast channels with a current list of licensed broadcast channels; and
   reconfiguring the tracked mobile device with the mapped list of licensed broadcast channels.

2. The method of claim 1, the method further comprising:
   receiving, in response to sending a query to a license server, a list of licensed broadcast channels associated with the location.

3. The method of claim 1, wherein the location may be determined using which one of global positioning system (GPS), triangulation, WiFi service set identifier (SSID), and Internet Protocol (IP) address provides most accurate available location.

4. The method of claim 1, wherein the location is associated with a geographic area and the received list of licensed broadcast channels is associated with the geographic area.

5. The method of claim 1, further comprising:
   sending a notification to the mobile device of an impending reconfiguration based on a changed location.

6. The method of claim 5, wherein the notification pauses active streaming on the mobile device.

7. The method of claim 1, further comprising:
   determining content data for at least one of active streaming content, paused streaming content, or saved streaming content on the mobile device, wherein the reconfiguring causes active streaming to pause and resume on a reconfigured licensed broadcast channel using the content data.

8. The method of claim 7, wherein the content data includes at least one of a name of active content, a name of paused content, a name of saved content, licensed broadcast channel for the active content, licensed broadcast channel for the paused content, licensed broadcast channel for the saved content, time data associated with the active content, time data associated with the paused content, time data associated with the saved content, content status, active streaming data, paused streaming data, and saved streaming data, the method further comprising:
   configuring streaming settings at the mobile device based on the content data.

9. A method for location based broadcast channel reconfiguration, the method comprising:
   checking whether a location of a mobile device is inside a licensed area absent content viewing status at the mobile device;
   receiving, in response to a real-time query to a license server when the location is outside the licensed area, a list of licensed broadcast channels associated with a new licensed area associated with the location;
   generating a map comparing the received list of licensed broadcast channels with a current list of licensed broadcast channels; and
   sending a reconfiguration command to the mobile device with the map.

10. The method of claim 9, wherein the location may be determined using a prioritized list of global positioning system (GPS), triangulation, WiFi service set identifier (SSID), and Internet Protocol (IP) address.

11. The method of claim 9, wherein the location is associated with a geographic area and the received list of licensed broadcast channels is associated with the geographic area, and wherein the licensed area and the new licensed area are geographic areas.

12. The method of claim 9, further comprising:
   sending a reconfiguration alert to the mobile device when the mobile device is leaving or has left the licensed area.

13. The method of claim 12, wherein the reconfiguration alert pauses active streaming on the mobile device.

14. The method of claim 12, further comprising:
   obtaining content data for at least one of active streaming content, paused streaming content, or saved streaming content on the mobile device.

15. The method of claim 14, wherein the content data includes at least one of a name of active content, a name of paused content, a name of saved content, licensed broadcast channel for the active content, licensed broadcast channel for the paused content, licensed broadcast channel for the saved content, time data associated with the active content, time data associated with the paused content, time data associated with the saved content, content status, active streaming data, paused streaming data, and saved streaming data.

16. The method of claim 14, wherein the reconfiguration command causes active streaming to pause and resume on a mapped licensed broadcast channel using the content data.

17. An apparatus comprising:
   an Internet Protocol (IP) video application server configured to:
      obtain a location of a mobile device from a location server;
      receive, in response to a query to a license server when the location is outside a current location area, a list of approved media broadcast channels associated with a geographic area which includes the location;
      generate map by comparing the received list of approved media broadcast channels with a current list of approved media broadcast channels, and content data for at least one of active streaming content, paused streaming content, or saved streaming content on the mobile device; and
      send a message to the mobile device with the map and the content data to reconfigure the mobile device.

18. The apparatus of claim 17, wherein the location server is configured to determine the location using at least one of global positioning system (GPS), triangulation, WiFi service set identifier (SSID), and Internet Protocol (IP) address based on accuracy of location data.

19. The apparatus of claim 17, wherein the IP video application server is further configured to send a pause command to permit reconfiguration of the mobile device.

20. The apparatus of claim 19, wherein the message causes the mobile device to resume streaming on a mapped approved media broadcast channel using the content data.

* * * * *